United States Patent
Sutton

[11] 3,779,613
[45] Dec. 18, 1973

[54] ANTI-SKID BRAKING SYSTEMS

[75] Inventor: Christopher John Sutton, Tamworth, England

[73] Assignee: Girling Limited, Birmingham, England

[22] Filed: July 29, 1971

[21] Appl. No.: 167,411

[30] Foreign Application Priority Data
Sept. 9, 1970 Great Britain............. 43,114/70

[52] U.S. Cl..... 303/21 EB, 188/181 A, 303/21 CG, 303/21 AF, 307/291, 340/52 B, 340/410
[51] Int. Cl............................................. B60t 8/12
[58] Field of Search................ 73/518; 188/181 A; 303/20, 21 H; 307/233, 241; 324/73, 78, 324/162, 166; 340/52 R, 262, 410, 52 B

[56] References Cited
UNITED STATES PATENTS
| | | | |
|---|---|---|---|
| 3,275,384 | 9/1966 | Hirzel | 303/21 EB |
| 3,574,415 | 4/1971 | Stamm | 303/21 EB |
| 3,598,452 | 10/1971 | Clifford et al. | 303/20 X |
| 3,659,904 | 5/1972 | Stevens | 303/21 CG |

*Primary Examiner*—Milton Buchler
*Assistant Examiner*—Stephen G. Kunin
*Attorney*—Holman & Stern

[57] ABSTRACT

In an anti-skid braking system in which the speeds of two wheels are measured, the two wheels being on a common axle, the signals representing wheel speeds are converted to a suitable form by frequency to voltage converters and then applied to a differentiating circuit which produces a signal representing the rate of deceleration of the slowest wheel, this signal being used to release the brakes from the wheel to prevent skidding. The two frequency to voltage converters are associated with additional transistors and switches in such a way that when the vehicle is to be started, the differentiating circuit receives a signal representing a constant speed even though the vehicle is stationary. When the switch is then opened, the system reacts as if a sudden deceleration has occurred, and releases the brakes. In this way a test is obtained very simply of the operation of the anti-skid circuit.

4 Claims, 1 Drawing Figure

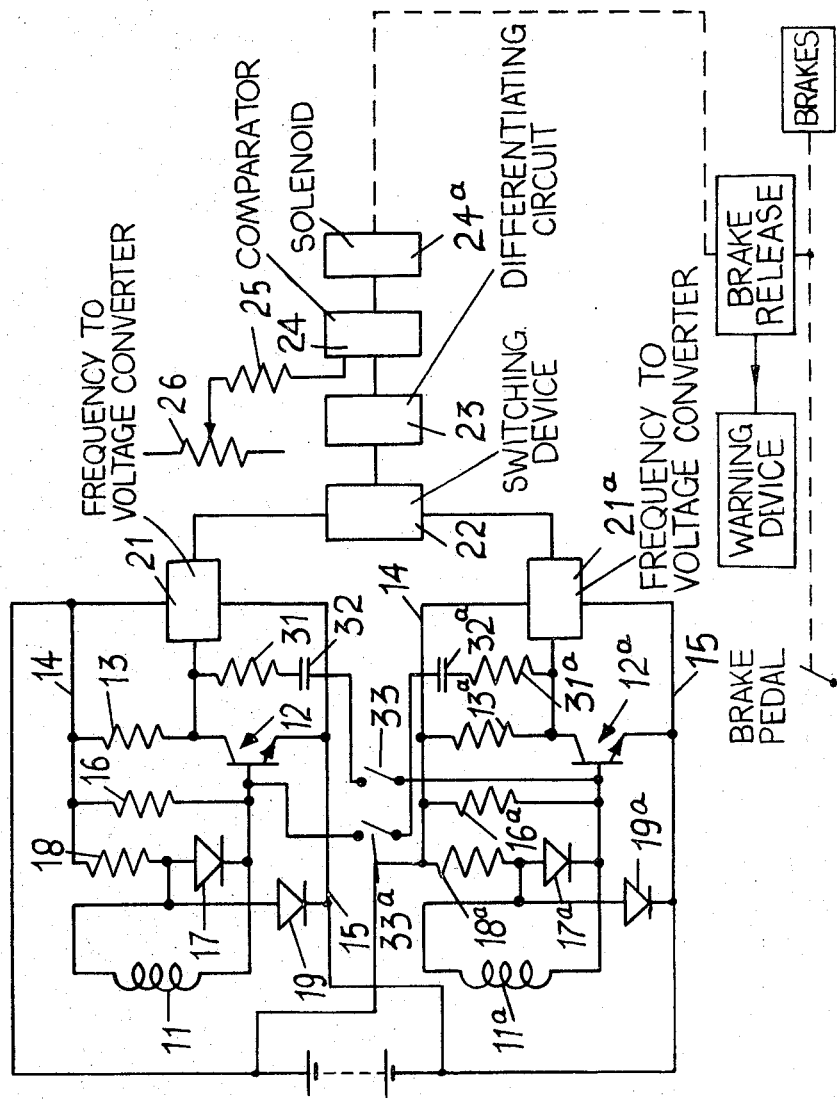

ANTI-SKID BRAKING SYSTEMS

This invention relates to frequency detecting circuits of the kind including a first winding in which is developed an a.c. signal representing a first frequency, a first transistor which is turned on and off by said signal, a first frequency to voltage converter for producing a voltage representing said first frequency, a second winding in which is developed a second a.c. signal representing a second frequency, a second transistor which is turned on and off by the second signal, a second frequency to voltage converter for producing a voltage representing said second frequency, and switch means for connecting the output from one or other of said converters to a load.

One example of such a circuit is in an anti-skid system for a vehicle, particularly a road vehicle. The two frequencies measured represent the speeds of two wheels of the vehicle, the wheels being on a common axle, and the switch means connects the output from the slowest wheel to the load, it being appreciated that the slowest wheel is the most likely to skid. The load consists of a differentiating circuit which produces an output representing the deceleration of the wheel, together with a comparator which compares this output with a signal representing what is regarded as a maximum safe deceleration without wheel slip occurring. If the deceleration exceeds the chosen value, the brakes are released from the wheel. However, although the invention is particularly designed for use with such a system, it can be used in any other arrangements in which two frequencies are detected, and one or other of the frequencies is applied to a load, which can be of any form and could for example be an instrument indicating the frequency in question.

The purpose of the invention is to provide in a circuit of the kind specified means for testing the circuit.

According to the invention, a circuit of the kind specified includes a first capacitor connected in series with a switch between the collector of the first transistor and the base of the second transistor, and a second capacitor connected in series with a switch between the base of the first transistor and the collector of the second transistor, the arrangement being such that when the switches are closed, the transistors together with the capacitors and the windings constitute a multi-vibrator which operates at a frequency determined by the capacitors and the windings, to give an output representing a predetermined frequency.

In the particular example of an anti-skid system, the multi-vibrator will, when the switches are closed, give an output representing a constant speed. When the switches are opened again, the load will behave as if an extremely rapid deceleration has occurred, so that the brakes should be released. A warning device can of course be incorporated to indicate that the brakes have been released. In such an arrangement, the switches are preferably operated automatically by the ignition key of the vehicle, so that every time the vehicle is started, the switches will be closed and then opened again and the warning device will operate momentarily, indicating to the driver that his anti-skid system is working satisfactorily.

The two transistors referred to can actually be parts of the first and second frequency to voltage converters respectively.

The accompanying drawing is a circuit diagram illustrating one example of the invention as applied to an anti-skid system for a road vehicle.

Referring to the drawing, one wheel of a road vehicle drives a generator producing in a pick-up winding 11 an a.c. signal at a frequency proportional to the speed of the wheel. One end of the winding 11 is connected to the base of an n-p-n transistor 12, the collector of which is connected through a resistor 13 to a positive supply line 14, and the emitter of which is connected to a negative supply line 15. The base of the transistor 12 is further connected to the line 14 through a resistor 16, and is also connected to the cathode of a diode 17, the anode of which is connected to the line 14 through a resistor 18. The other end of the winding 11 is connected to the junction of the resistor 18 and diode 17, and is further connected through a diode 19 to the line 15.

The transistor 12 is biased to a conductive state by current flow through the resistor 16, and is turned on and off by the signal developed in the winding 11. The collector of the transistor 12 is connected to a frequency to voltage converter 21, of which the transistor 12 forms part, and the output from the converter 21 is a voltage representing the speed of the wheel. The diode 19 is forward biased by current flow from the positive supply rail 14, through resistor 18. The forward volt drop across the diode 19 then nearly equals the transistor 12 base-emitter voltage. This makes the circuit more sensitive and only 200 to 300 mv of signal are required from the pick-up coil to switch transistor 12 on.

The diode 17 is provided to protect the transistor 12 base-emitter junction against excessive reverse voltage.

It will be appreciated that the pick-ups used have an output voltage proportional to speed for most of the speed range, so that the output voltage at rest is zero. A small output voltage typically one-half volt, is produced at 2 to 3 m.p.h., and as much as 35 to 40 volts are produced at speeds of 40 to 50 m.p.h. Thus the circuit must be sensitive to the lower speed output voltages, but must not be damaged at high speeds by high voltages. The pick-ups are chosen to have high impedances and hence short circuit current protection is used.

A second wheel on the same axle operates a second generator, having a pick-up winding 11a associated therewith. The signal developed in the winding 11a controls the output of another frequency to voltage converter 21a through the intermediary of components similar to those associated with the winding 11, and indicated by the same reference numerals but with the suffix a. The lines 14 and 15 can of course be common to the two circuits.

The converters 21 and 21a are connected through a switching device 22 to a differentiating circuit 23, the output from which is fed to a comparator 24 which also receives a reference signal by way of a resistor 25 from the variable point on a resistor 26. The output from the comparator 24 operates a solenoid 24a which when energised releases the brakes.

In use, the switching device 22 passes to the differentiating circuit 23 the signal representing the frequency of the slowest wheel. The differentiating circuit 23 produces an output representing the deceleration of this wheel, and if the deceleration exceeds a value set by the comparator 24, then the brakes are released and held off for a predetermined period of time, and then re-applied, after which the cycle is repeated if the deceleration is still too rapid.

The collector of the transistor 12 is connected through a resistor 31, a capacitor 32 and a switch 33 in series to the base of the transistor 12a. Similarly, the collector of the transistor 12a is connected through a resistor 31a, a capacitor 32a and a switch 33a to the base of the transistor 12, the switches 33 and 33a being ganged for simultaneous operation. Normally, the switches 33 and 33a are open, but when it is desired to test the circuit, the switches 33 and 33a are closed, providing capacitive cross-coupling between the collectors and bases of the transistors 12 and 12a, and connecting these transistors, together with the capacitors 32 and 32a and the windings 11 and 11a, across the supply lines 14 and 15 in the manner of a standard multivibrator which oscillates at a frequency determined by the capacitors and the windings. If for any reason one of the windings 11 or 11a does not have the correct pick-up impedance (for example if it is shorted or open-circuited), then of course the circuit will not oscillate, and so an indication will be given that one of the windings is faulty. However, assuming that the windings are satisfactory, then a signal will be fed to the differentiating circuit 23 representing a constant wheel speed, which typically would be of the order of 50 m.p.h. When the switches 33 and 33a are opened again, the signal fed to the differentiating circuit 23 becomes zero, and so the differentiating circuit behaves as if the vehicle has decelerated from 50 m.p.h. to zero in zero time. Inevitably, such a rapid deceleration will operate the comparator 24 to release the brakes, and a warning lamp or other device is incorporated to indicate to the driver that the solenoid 24a has been energised. The brakes need not necessarily be applied at this time of course, and conveniently the switches 33 and 33a are combined with the ignition switch of the vehicle, so that every time the vehicle is started the switches 33 and 33a will be closed and then opened, so that a momentary energisation of the warning device will result, indicating to the driver that his anti-skid system is operative.

I claim:
1. An anti-skid braking system for a vehicle having first and second wheels on a common axle, including a first winding, means for developing in said first winding an a.c. signal representing the rotational speed of the first wheel, a first transistor which is turned on and off by said signal, a first frequency to voltage converter for producing a voltage representing the rotational speed of the first wheel, a second winding, means for developing in said second winding a second a.c. signal representing the rotational speed of the second wheel, a second transistor which is turned on and off by the second signal, a second frequency to voltage converter for producing a voltage representing the rotational speed of the second wheel, switch means for connecting the output from the converter which is coupled to the slowest wheel to a differentiating circuit, said differentiating circuit producing an output representing the deceleration of the slowest wheel, a comparator to which the output from the differentiating circuit is applied, said comparator comparing the output from the differentiating circuit with a signal representing maximum deceleration without wheel slip occuring, and serving to release the brakes from the wheel if wheel slip is about to occur, a first capacitor connected in series with a switch between the collector of the first transistor and the base of the second transistor, and a second capacitor connected in series with a switch between the base of the first transistor and the collector of the second transistor, closing of said switches giving an output to the differentiating circuit representing a constant speed, and re-opening of said switches producing an output simulating an extremely rapid deceleration.

2. A system as claimed in claim 1 including a warning device for indicating that the brakes have been released.

3. A system as claimed in claim 1 in which the switches are operated automatically by the ignition key of the vehicle.

4. A system as claimed in claim 1 in which the two transistors are parts of the first and second frequency to voltage converters respectively.

* * * * *